US012469416B2

(12) United States Patent
Kang

(10) Patent No.: US 12,469,416 B2
(45) Date of Patent: Nov. 11, 2025

(54) ORGANIC LIGHT EMITTING DIODE DISPLAY WITH BURNT DETECTION PROTECTION

(71) Applicant: LG ELECTRONICS INC., Seoul (KR)

(72) Inventor: Heechen Kang, Seoul (KR)

(73) Assignee: LG ELECTRONICS INC., Seoul (KR)

(*) Notice: Subject to any disclaimer, the term of this patent is extended or adjusted under 35 U.S.C. 154(b) by 0 days.

(21) Appl. No.: 18/577,657

(22) PCT Filed: Aug. 30, 2021

(86) PCT No.: PCT/KR2021/011590
§ 371 (c)(1),
(2) Date: Jan. 8, 2024

(87) PCT Pub. No.: WO2023/282384
PCT Pub. Date: Jan. 12, 2023

(65) Prior Publication Data

US 2024/0321157 A1 Sep. 26, 2024

(30) Foreign Application Priority Data

Jul. 8, 2021 (KR) ........................ 10-2021-0089434

(51) Int. Cl.
*G09G 3/00* (2006.01)
*G09G 3/20* (2006.01)
*G09G 3/3266* (2016.01)

(52) U.S. Cl.
CPC ........... *G09G 3/006* (2013.01); *G09G 3/2092* (2013.01); *G09G 3/3266* (2013.01);
(Continued)

(58) Field of Classification Search
CPC ...................................................... G09G 3/006
See application file for complete search history.

(56) References Cited

U.S. PATENT DOCUMENTS 11,170,686 B2 11/2021 Kang et al.
2009/0174628 A1* 7/2009 Wang .................. G09G 3/3225 345/76
(Continued)

FOREIGN PATENT DOCUMENTS

KR 10-2015-0017528 2/2015
KR 10-2016-0078610 7/2016
(Continued)

OTHER PUBLICATIONS

PCT International Application No. PCT/KR2021/011590, International Search Report dated Mar. 25, 2022, 5 pages.
(Continued)

*Primary Examiner* — William Boddie
*Assistant Examiner* — Andrew B Schnirel
(74) *Attorney, Agent, or Firm* — LEE, HONG, DEGERMAN, KANG & WAIMEY

(57) ABSTRACT

An organic light emitting diode display according to an embodiment of the present disclosure may comprise: a display panel comprising a plurality of pixels; a gate driving part that drives a plurality of gate lines respectively connected to the plurality of pixels; a data driving part that drives a plurality of data lines respectively connected to the plurality of pixels; a current detection circuit that detects a current flowing through each of the gate lines and, when the detection current is overcurrent, generates feedback indicating the overcurrent; and a timing controller that turns off the power of the organic light emitting diode display in response to the feedback indicating the overcurrent.

9 Claims, 13 Drawing Sheets

(52) U.S. Cl.
CPC ................. *G09G 2320/046* (2013.01); *G09G 2320/0606* (2013.01); *G09G 2330/025* (2013.01); *G09G 2330/027* (2013.01); *G09G 2330/12* (2013.01); *G09G 2354/00* (2013.01)

(56) References Cited

U.S. PATENT DOCUMENTS

| | | | | |
|---|---|---|---|---|
| 2013/0113773 | A1* | 5/2013 | Lee | H05B 45/3725 315/119 |
| 2015/0194800 | A1* | 7/2015 | Kim | G09G 3/3677 361/95 |
| 2016/0189599 | A1 | 6/2016 | Lee | |
| 2021/0183289 | A1* | 6/2021 | Kang | G09G 3/2092 |

FOREIGN PATENT DOCUMENTS

| | | |
|---|---|---|
| KR | 10-2017-0080902 | 7/2017 |
| KR | 10-1981281 | 5/2019 |
| KR | 10-2021-0001466 | 1/2021 |
| KR | 10-2021-0011293 | 2/2021 |
| KR | 10-2239898 | 4/2021 |
| KR | 10-2021-0077027 | 6/2021 |

OTHER PUBLICATIONS

Korean Intellectual Property Office Application No. 10-2021-0089434, Office Action dated Sep. 10, 2024, 6 pages.
Korean Intellectual Property Office Application No. 10-2021-0089434, Office Action dated Apr. 7, 2025, 4 pages.

* cited by examiner

180

ORGANIC LIGHT EMITTING DIODE DISPLAY WITH BURNT DETECTION PROTECTION

CROSS-REFERENCE TO RELATED APPLICATIONS

This application is the National Stage filing under 35 U.S.C. 371 of International Application No. PCT/KR2021/011590, filed on Aug. 30, 2021, which claims the benefit of earlier filing date and right of priority to Korean Application No. 10-2021-0089434, filed on Jul. 8, 2021, the contents of which are all hereby incorporated by reference herein their entirety.

TECHNICAL FIELD

The present disclosure relates to a display device, and more particularly, to an organic light emitting diode display.

BACKGROUND ART

In recent years, the types of display devices have been diversified. Among them, organic light emitting diode displays (hereinafter, referred to as OLED displays) are being widely used.

An OLED display is a display using an organic light emitting element. Since the organic light emitting element is a self-luminous element, the OLED display has an advantage in that power consumption is lower than that of a liquid crystal display, which requires a backlight, and the OLED display is capable of being manufactured to be thin. In addition, the OLED display has a wide viewing angle and a fast response speed.

When defects occur in components of the OLED display, a burnt detection protection (BDP) function is performed to prevent burnt of the corresponding element.

After performing the BDP function, the OLED display is turned off, and thus, when checking the defects, it is difficult to determine whether a power board is defective, a main board is defective, or a gate driving chip is defective.

Thus, a lot of time and effort are required to resolve the defects.

DISCLOSURE OF THE INVENTION

Technical Problem

An object of the present disclosure is to clearly identify a cause of defects in an OLED display.

An object of the present disclosure is to improve development efficiency by using only a minimum number of circuits in order to determine a cause of defects in an OLED display.

Technical Solution

An organic light emitting diode display according to an embodiment of the present disclosure includes a display panel including a plurality of pixels, a gate driving unit configured to drive a plurality of gate lines respectively connected to the plurality of pixels, a data driving unit configured to drive a plurality of data lines respectively connected to the plurality of pixels, a current detection circuit configured to detect current flowing through each of the gate lines and generate feedback that indicates overcurrent when the detected current is the overcurrent, and a timing controller configured to turn off power of the organic light emitting diode display in response to the feedback that indicates the overcurrent.

Advantageous Effects

According to an embodiment of the present disclosure, it may be possible to clearly identify the module defect problems of the OLED display, and the service efficiency may be improved through the consumer guide.

In addition, the circuit for the debug may be simplified to improving the development efficiency of the OLED display.

MODE FOR CARRYING OUT THE INVENTION

Hereinafter, the present disclosure will be described in more detail with reference to the drawings.

Figure 1:
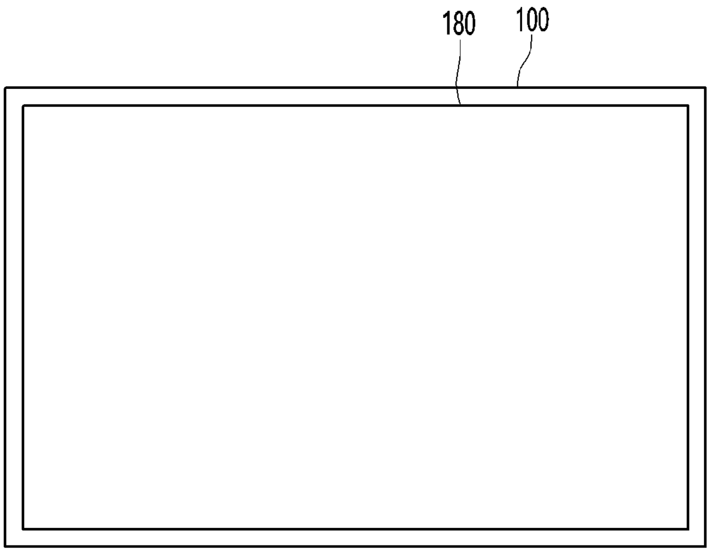
FIG. 1 is a diagram illustrating a display device according to an embodiment of the present disclosure.

FIG. 1 is a diagram illustrating a display device according to an embodiment of the present disclosure.

Referring to the drawings, a display device 100 may include a display unit 180.

Meanwhile, the display unit 180 may be implemented with any one of various panels. For example, the display unit 180 may be any one of a liquid crystal display panel (LCD panel), an organic light emitting diode panel (OLED panel), and an inorganic light emitting diode panel (LED panel).

In the present disclosure, it is assumed that the display unit 180 includes an organic light emitting diode panel (OLED panel). It should be noted that this is only exemplary, and the display unit 180 may include a panel other than an organic light emitting diode panel (OLED panel).

Meanwhile, the display device 100 of FIG. 1 may be a monitor, a TV, a tablet PC, or a mobile terminal.

Figure 2:
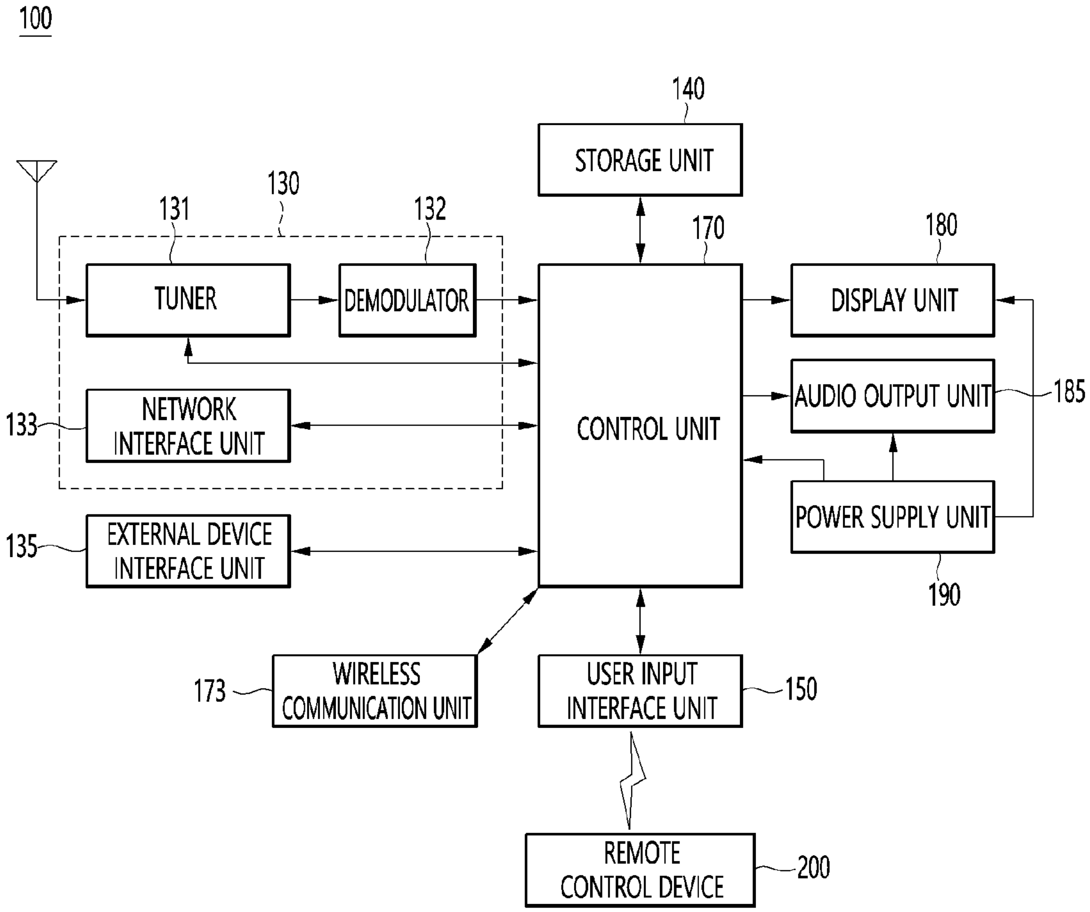
FIG. 2 is a block diagram illustrating a configuration of the display device of FIG. 1.

FIG. 2 is a block diagram illustrating a configuration of the display device of FIG. 1.

Referring to FIG. 2, the display device 100 may include a broadcast receiving unit 130, an external device interface unit 135, a storage unit 140, a user input interface unit 150, a control unit 170, and a wireless communication unit 173, a display unit 180, an audio output unit 185, and a power supply unit 190.

The broadcast receiving unit 130 may include a tuner 131, a demodulator 132, and a network interface unit 133.

The tuner 131 may select a specific broadcast channel according to a channel selection command. The tuner 131 may receive a broadcast signal for the selected specific broadcast channel.

The demodulator 132 may separate the received broadcast signal into a video signal, an audio signal, and a data signal related to a broadcast program, and restore the separated video signal, audio signal, and data signal to a format capable of being output.

The network interface unit 133 may provide an interface for connecting the display device 100 to a wired/wireless network including an Internet network. The network interface unit 133 may transmit or receive data to or from other users or other electronic devices through a connected network or another network linked to the connected network.

The network interface unit 133 may access a predetermined web page through the connected network or the other network linked to the connected network. That is, it is possible to access a predetermined web page through a network, and transmit or receive data to or from a corresponding server.

In addition, the network interface unit 133 may receive content or data provided by a content provider or a network operator. That is, the network interface unit 133 may receive content such as a movie, advertisement, game, VOD, broadcast signal, and related information provided by a content provider or a network provider through a network.

In addition, the network interface unit 133 may receive update information and update files of firmware provided by the network operator, and may transmit data to an Internet or content provider or a network operator.

The network interface unit 133 may select and receive a desired application from among applications that are open to the public through a network.

The external device interface unit 135 may receive an application or a list of applications in an external device adjacent thereto, and transmit the same to the control unit 170 or the storage unit 140.

The external device interface unit 135 may provide a connection path between the display device 100 and the external device. The external device interface unit 135 may receive one or more of video and audio output from an external device wirelessly or wired to the display device 100 and transmit the same to the control unit 170. The external device interface unit 135 may include a plurality of external input terminals. The plurality of external input terminals may include an RGB terminal, one or more High Definition Multimedia Interface (HDMI) terminals, and a component terminal.

The video signal of the external device input through the external device interface unit 135 may be output through the display unit 180. The audio signal of the external device input through the external device interface unit 135 may be output through the audio output unit 185.

The external device connectable to the external device interface unit 135 may be any one of a set-top box, a Blu-ray player, a DVD player, a game machine, a sound bar, a smartphone, a PC, a USB memory, and a home theater, but this is only an example.

In addition, a part of content data stored in the display device 100 may be transmitted to a selected user among a selected user or a selected electronic device among other users or other electronic devices registered in advance in the display device 100.

The storage unit 140 may store programs for signal processing and control of the control unit 170, and may store video, audio, or data signals, which have been subjected to signal-processed.

In addition, the storage unit 140 may perform a function for temporarily storing video, audio, or data signals input from an external device interface unit 135 or the network interface unit 133, and store information on a predetermined video through a channel storage function.

The storage unit 140 may store an application or a list of applications input from the external device interface unit 135 or the network interface unit 133.

The display device 100 may play back a content file (a moving image file, a still image file, a music file, a document file, an application file, or the like) stored in the storage unit 140 and provide the same to the user.

The user input interface unit 150 may transmit a signal input by the user to the control unit 170 or a signal from the control unit 170 to the user. For example, the user input interface unit 150 may receive and process a control signal such as power on/off, channel selection, screen settings, and the like from the remote control device 200 in accordance with various communication methods, such as a Bluetooth communication method, a WB (Ultra Wideband) communication method, a ZigBee communication method, an RF (Radio Frequency) communication method, or an infrared (IR) communication method or may perform processing to transmit the control signal from the control unit 170 to the remote control device 200.

In addition, the user input interface unit 150 may transmit a control signal input from a local key (not shown) such as a power key, a channel key, a volume key, and a setting value to the control unit 170.

The video signal image-processed by the control unit 170 may be input to the display unit 180 and displayed with video corresponding to a corresponding video signal. Also, the video signal image-processed by the control unit 170 may be input to an external output device through the external device interface unit 135.

The audio signal processed by the control unit 170 may be output to the audio output unit 185. Also, the audio signal processed by the control unit 170 may be input to the external output device through the external device interface unit 135.

In addition, the control unit 170 may control the overall operation of the display device 100.

In addition, the control unit 170 may control the display device 100 by a user command input through the user input interface unit 150 or an internal program and connect to a network to download an application a list of applications or applications desired by the user to the display device 100.

The control unit 170 may allow the channel information or the like selected by the user to be output through the display unit 180 or the audio output unit 185 along with the processed video or audio signal.

In addition, the control unit 170 may output a video signal or an audio signal through the display unit 180 or the audio output unit 185, according to a command for playing back a video of an external device through the user input interface unit 150, the video signal or the audio signal being input from an external device, for example, a camera or a camcorder, through the external device interface unit 135.

Meanwhile, the control unit 170 may allow the display unit 180 to display a video, for example, allow a broadcast video which is input through the tuner 131 or an external input video which is input through the external device interface unit 135, a video which is input through the network interface unit or a video which is stored in the storage unit 140 to be displayed on the display unit 180. In this case, the video displayed on the display unit 180 may be a still image or a moving image, and may be a 2D image or a 3D image.

In addition, the control unit 170 may allow content stored in the display device 100, received broadcast content, or external input content input from the outside to be played back, and the content may have various forms such as a broadcast video, an external input video, an audio file, still images, accessed web screens, and document files.

The wireless communication unit 173 may communicate with an external device through wired or wireless communication. The wireless communication unit 173 may perform short range communication with an external device. To this end, the wireless communication unit 173 may support short range communication using at least one of Bluetooth™, Bluetooth Low Energy (BLE), Radio Frequency Identification (RFID), Infrared Data Association (IrDA), Ultra Wideband (UWB), ZigBee, Near Field Communication (NFC), Wi-Fi (Wireless-Fidelity), Wi-Fi (Wireless-Fidelity), Wi-Fi Direct, and Wireless USB (Wireless Universal Serial Bus) technologies. The wireless communication unit 173 may support wireless communication between the display device 100 and a wireless communication system, between the display device 100 and another display device 100, or between the display device 100 and a network in which the display device 100 (or an external server) is located through wireless area networks. The wireless area networks may be wireless personal area networks.

Here, the another display device 100 may be a wearable device (e.g., a smartwatch, smart glasses or a head mounted display (HMD), a mobile terminal such as a smart phone, which is able to exchange data (or interwork) with the display device 100 according to the present disclosure. The wireless communication unit 173 may detect (or recognize) a wearable device capable of communication around the display device 100. Furthermore, when the detected wearable device is an authenticated device to communicate with the display device 100 according to the present disclosure, the control unit 170 may transmit at least a portion of data processed by the display device 100 to the wearable device through the wireless communication unit 173. Therefore, a user of the wearable device may use data processed by the display device 100 through the wearable device.

The display unit 180 may convert a video signals, data signal, or OSD signal processed by the control unit 170, or a video signal or data signal received from the external device interface unit 135 into R, G, and B signals, and generate drive signals.

Meanwhile, the display device 100 illustrated in FIG. 2 is only an embodiment of the present disclosure, and therefore, some of the illustrated components may be integrated, added, or omitted depending on the specification of the display device 100 that is actually implemented.

That is, two or more components may be combined into one component, or one component may be divided into two or more components as necessary. In addition, a function performed in each block is for describing an embodiment of the present disclosure, and its specific operation or device does not limit the scope of the present disclosure.

According to another embodiment of the present disclosure, unlike the display device 100 shown in FIG. 2, the display device 100 may receive a video through the network interface unit 133 or the external device interface unit 135 without a tuner 131 and a demodulator 132 and play back the same.

For example, the display device 100 may be divided into an image processing device, such as a set-top box, for receiving broadcast signals or content according to various network services, and a content playback device that plays back content input from the image processing device.

In this case, an operation method of the display device according to an embodiment of the present disclosure will be described below may be implemented by not only the display device 100 as described with reference to FIG. 2 and but also one of an image processing device such as the separated set-top box and a content playback device including the display unit 180 the audio output unit 185.

The audio output unit 185 may receive a signal audio-processed by the control unit 170 and output the same with audio.

The power supply unit 190 may supply corresponding power to the display device 100. Particularly, power may be supplied to the control unit 170 that may be implemented in the form of a system on chip (SOC), the display unit 180 for video display, and the audio output unit 185 for audio output.

Specifically, the power supply unit 190 may include a converter that converts AC power into DC power, and a dc/dc converter that converts a level of DC power.

The remote control device 200 may transmit a user input to the user input interface unit 150. To this end, the remote control device 200 may use Bluetooth, Radio Frequency (RF) communication, Infrared (IR) communication, Ultra Wideband (UWB), ZigBee, or the like. In addition, the remote control device 200 may receive a video, audio, or data signal or the like output from the user input interface unit 150, and display or output the same through the remote control device 200 by video or audio.

Figure 3:
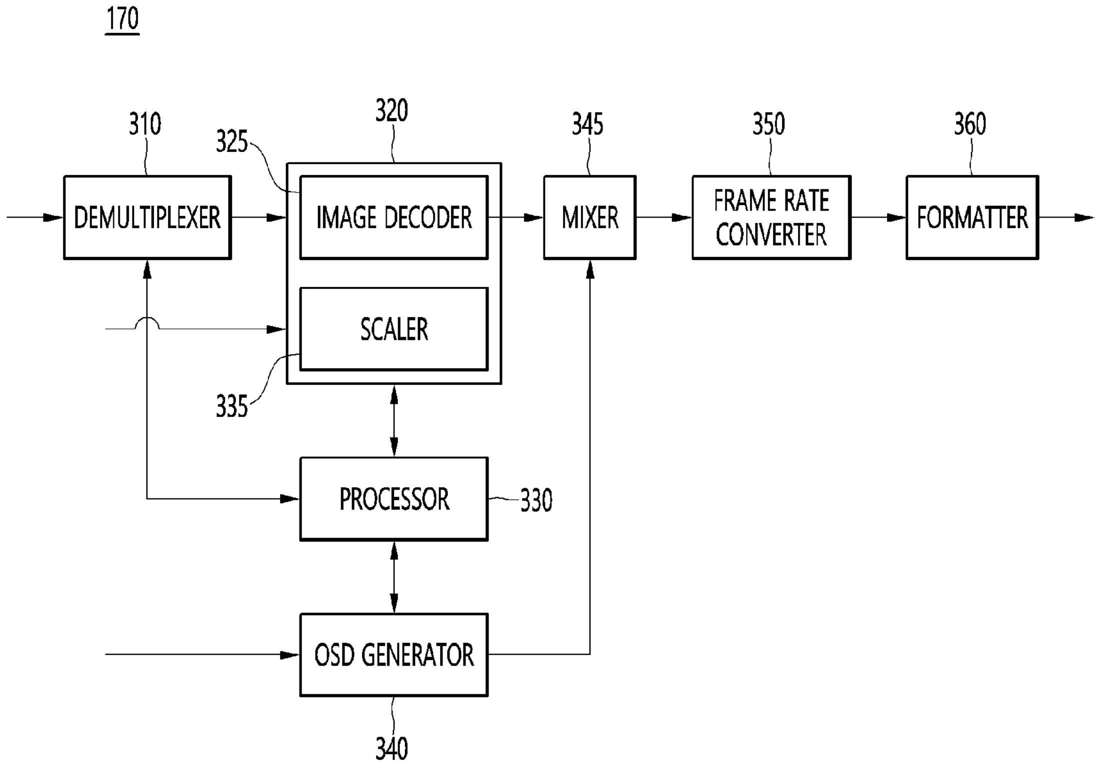
FIG. 3 is an example of an internal block diagram of a control unit of FIG. 2.

FIG. 3 is an example of an internal block diagram of a control unit of FIG. 2.

Referring to the drawings, the control unit 170 according to an embodiment of the present disclosure may include a demultiplexer 310, an image processing unit 320, a processor 330, an OSD generator 340, a mixer 345, a frame rate converter 350, and a formatter 360. In addition, an audio processing unit (not shown) and a data processing unit (not shown) may be further included.

The demultiplexer 310 may demultiplex input stream. For example, when MPEG-2 TS is input, the demultiplexer 310 may demultiplex the MPEG-2 TS to separate the MPEG-2 TS into video, audio, and data signals. Here, the stream signal input to the demultiplexer 310 may be a stream signal output from the tuner 131, the demodulator 132 or the external device interface unit 135.

The image processing unit 320 may perform image processing on the demultiplexed video signal. To this end, the image processing unit 320 may include an image decoder 325 and a scaler 335.

The image decoder 325 may decode the demultiplexed video signal, and the scaler 335 may scale a resolution of the decoded video signal to be output through the display unit 180.

The video decoder 325 may be provided with decoders of various standards. For example, an MPEG-2, H.264 decoder, a 3D video decoder for color images and depth images, and a decoder for multi-view images may be provided.

The processor 330 may control the overall operation of the display device 100 or of the control unit 170. For example, the processor 330 may control the tuner 131 to select (tune) an RF broadcast corresponding to a channel selected by a user or a pre-stored channel.

In addition, the processor 330 may control the display device 100 by a user command input through the user input interface unit 150 or an internal program.

In addition, the processor 330 may perform data transmission control with the network interface unit 135 or the external device interface unit 135.

In addition, the processor 330 may control operations of the demultiplexer 310, the image processing unit 320, and the OSD generator 340 in the control unit 170.

The OSD generator 340 may generate an OSD signal according to a user input or by itself. For example, based on a user input signal, a signal for displaying various information on a screen of the display unit 180 as a graphic or text may be generated. The generated OSD signal may include various data such as a user interface screen, various menu screens, widgets, and icons of the display device 100. In addition, the generated OSD signal may include a 2D object or a 3D object.

In addition, the OSD generator 340 may generate a pointer that may be displayed on the display unit 180 based on a pointing signal input from the remote control device 200. In particular, such a pointer may be generated by the pointing signal processing unit, and the OSD generator 340 may include such a pointing signal processing unit (not shown). Of course, the pointing signal processing unit (not shown) may be provided separately, not be provided in the OSD generator 340.

The mixer 345 may mix the OSD signal generated by the OSD generator 340 and the decoded video signal image-processed by the image processing unit 320. The mixed video signal may be provided to the frame rate converter 350.

The frame rate converter (FRC) 350 may convert a frame rate of an input video. On the other hand, the frame rate converter 350 may output the input video as it is, without a separate frame rate conversion.

On the other hand, the formatter 360 may change the format of the input video signal into a video signal to be displayed on the display and output the same.

The formatter 360 may change the format of the video signal. For example, it is possible to change the format of the 3D video signal to any one of various 3D formats such as a side by side format, a top/down format, a frame sequential format, an interlaced format, a checker box and the like.

Meanwhile, the audio processing unit (not shown) in the control unit 170 may perform audio processing of a demultiplexed audio signal. To this end, the audio processing unit (not shown) may include various decoders.

In addition, the audio processing unit (not shown) in the control unit 170 may process a base, treble, volume control, and the like.

The data processing unit (not shown) in the control unit 170 may perform data processing of the demultiplexed data signal. For example, when the demultiplexed data signal is an encoded data signal, the demultiplexed data signal may be decoded. The coded data signal may be electronic program guide information including broadcast information such as a start time and an end time of a broadcast program broadcast on each channel.

Meanwhile, a block diagram of the control unit 170 illustrated in FIG. 3 is a block diagram for an embodiment of the present disclosure. The components of the block diagram may be integrated, added, or omitted depending on the specification of the control unit 170 that is actually implemented.

In particular, the frame rate converter 350 and the formatter 360 may not be provided in the control unit 170, and may be separately provided or separately provided as a single module.

Figure 4A:
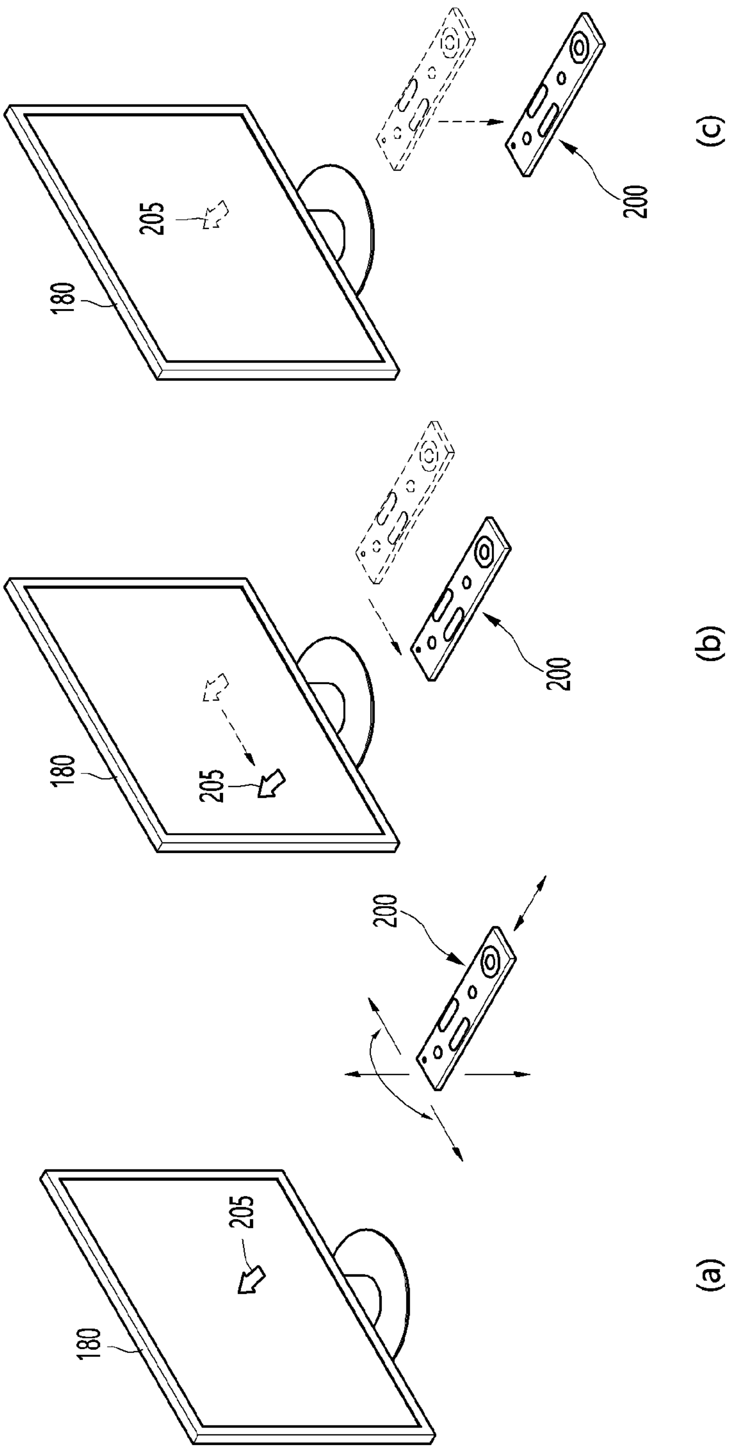
FIG. 4A is a diagram illustrating a control method for a remote control device of FIG. 2.

FIG. 4A is a diagram illustrating a control method for a remote control device of FIG. 2.

In (a) of FIG. 4A, it is illustrated that a pointer 205 corresponding to the remote control device 200 is displayed on the display unit 180.

The user may move or rotate the remote control device 200 up and down, left and right (FIG. 4A (b)), and forward and backward ((c) of FIG. 4A). The pointer 205 displayed on the display unit 180 of the display device may correspond to the movement of the remote control device 200. The remote control device 200 may be referred to as a spatial remote controller or a 3D pointing device, as the corresponding pointer 205 is moved and displayed according to the movement on a 3D space, as shown in the drawing.

In (b) of FIG. 4A, it is illustrated that that when the user moves the remote control device 200 to the left, the pointer 205 displayed on the display unit 180 of the display device moves to the left correspondingly.

Information on the movement of the remote control device 200 detected through a sensor of the remote control device 200 is transmitted to the display device. The display device may calculate the coordinates of the pointer 205 based on information on the movement of the remote control device 200. The display device may display the pointer 205 to correspond to the calculated coordinates.

In (c) of FIG. 4A, it is illustrated that a user moves the remote control device 200 away from the display unit 180 while pressing a specific button in the remote control device 200. Accordingly, a selected region in the display unit 180 corresponding to the pointer 205 may be zoomed in and displayed to be enlarged. Conversely, when the user moves the remote control device 200 close to the display unit 180, the selected region in the display unit 180 corresponding to the pointer 205 may be zoomed out and displayed to be reduced. On the other hand, when the remote control device 200 moves away from the display unit 180, the selected region may be zoomed out, and when the remote control device 200 moves close to the display unit 180, the selected region may be zoomed in.

Meanwhile, in a state in which a specific button in the remote control device 200 is being pressed, recognition of up, down, left, or right movements may be excluded. That is, when the remote control device 200 moves away from or close to the display unit 180, the up, down, left, or right movements are not recognized, and only the forward and backward movements may be recognized. In a state in which a specific button in the remote control device 200 is not being pressed, only the pointer 205 moves according to the up, down, left, or right movements of the remote control device 200.

Meanwhile, the movement speed or the movement direction of the pointer 205 may correspond to the movement speed or the movement direction of the remote control device 200.

Figure 4B:
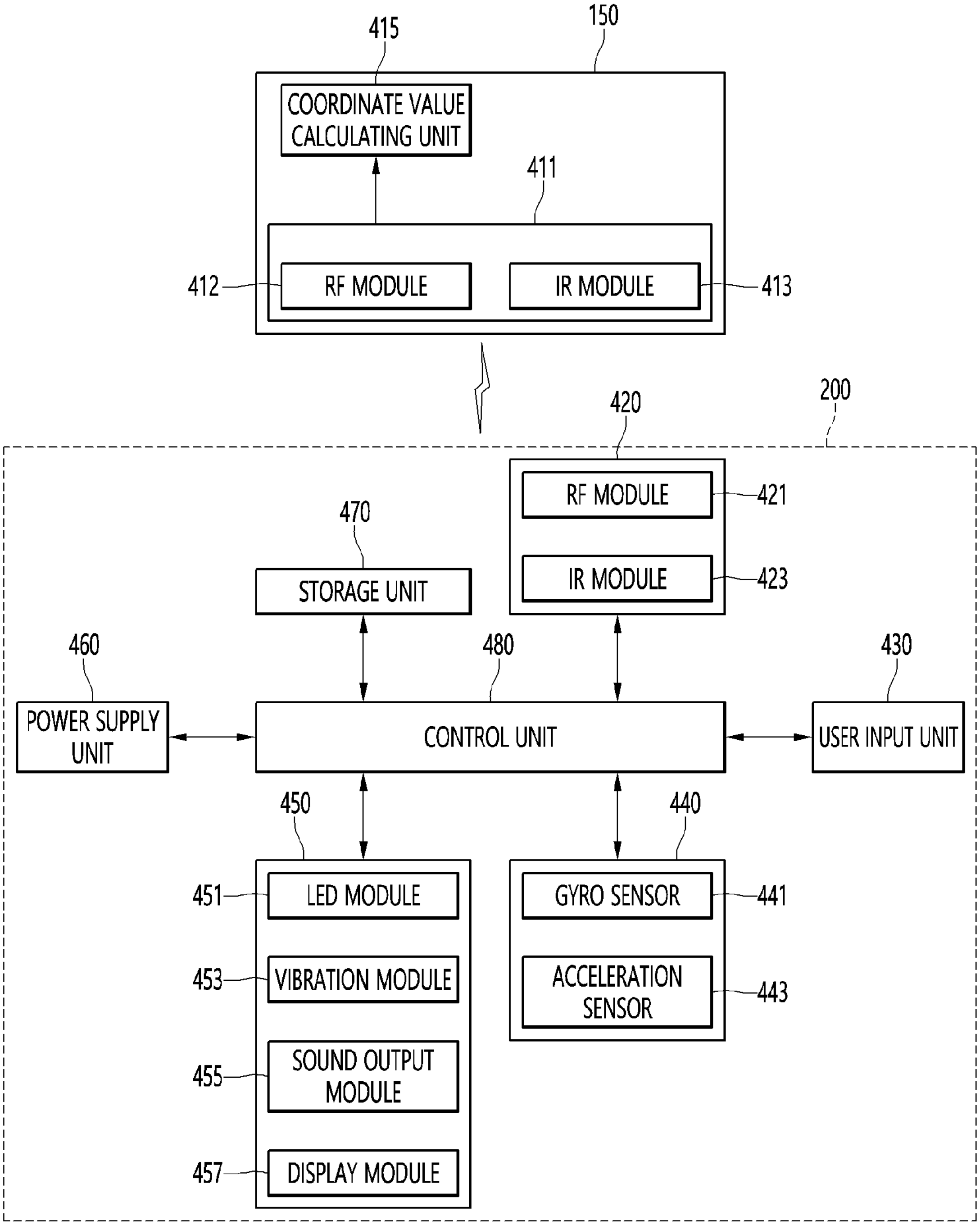
FIG. 4B is an internal block diagram of the remote control device of FIG. 2.

FIG. 4B is an internal block diagram of the remote control device of FIG. 2.

Referring to the drawing, the remote control device 200 may include a wireless communication unit 420, a user input unit 430, a sensor unit 440, an output unit 450, a power supply unit 460, a storage unit 470, ad a control unit 480.

The wireless communication unit 420 may transmit and receive signals to and from any one of the display devices according to the embodiments of the present disclosure described above. Among the display devices according to embodiments of the present disclosure, one display device 100 will be described as an example.

In the present embodiment, the remote control device 200 may include an RF module 421 capable of transmitting and receiving signals to and from the display device 100 according to the RF communication standard. In addition, the remote control device 200 may include an IR module 423 capable of transmitting and receiving signals to and from the display device 100 according to the IR communication standard.

In the present embodiment, the remote control device 200 transmits a signal containing information on the movement of the remote control device 200 to the display device 100 through the RF module 421.

Also, the remote control device 200 may receive a signal transmitted by the display device 100 through the RF module 421. In addition, the remote control device 200 may transmit a command regarding power on/off, channel change, volume adjustment, or the like to the display device 100 through the IR module 423 as necessary.

The user input unit 430 may include a keypad, a button, a touch pad, or a touch screen. The user may input a command related to the display device 100 to the remote control device 200 by operating the user input unit 430. When the user input unit 430 includes a hard key button, the user may input a command related to the display device 100 to the remote control device 200 through a push operation of the hard key button. When the user input unit 430 includes a touch screen, the user may input a command related to the display device 100 to the remote control device 200 by touching a soft key of the touch screen. In addition, the user input unit 430 may include various types of input means that may be operated by a user, such as a scroll key or a jog key, and the present embodiment does not limit the scope of the present disclosure.

The sensor unit 440 may include a gyro sensor 441 or an acceleration sensor 443. The gyro sensor 441 may sense information on the movement of the remote control device 200.

For example, the gyro sensor 441 may sense information on the operation of the remote control device 200 based on the x, y, and z axes. The acceleration sensor 443 may sense information on the movement speed of the remote control device 200 and the like. Meanwhile, a distance measurement sensor may be further provided, whereby a distance to the display unit 180 may be sensed.

The output unit 450 may output a video or audio signal corresponding to the operation of the user input unit 430 or a signal transmitted from the display device 100. The user may recognize whether the user input unit 430 is operated or whether the display device 100 is controlled through the output unit 450.

For example, the output unit 450 may include an LED module 451 that emits light, a vibration module 453 that generates vibration, a sound output module 455 that outputs sound, or a display module 457 that outputs a video when the user input unit 430 is operated or a signal is transmitted and received through the wireless communication unit 420.

The power supply unit 460 supplies power to the remote control device 200. The power supply unit 460 may reduce power consumption by stopping power supply when the remote control device 200 has not moved for a predetermined time. The power supply unit 460 may restart power supply when a predetermined key provided in the remote control device 200 is operated.

The storage unit 470 may store various types of programs and application data required for control or operation of the remote control device 200. When the remote control device 200 transmits and receives signals wirelessly through the display device 100 and the RF module 421, the remote control device 200 and the display device 100 transmit and receive signals through a predetermined frequency band. The control unit 480 of the remote control device 200 may store and refer to information on a frequency band capable of wirelessly transmitting and receiving signals to and from the display device 100 paired with the remote control device 200 in the storage unit 470.

The control unit 480 may control all matters related to the control of the remote control device 200. The control unit 480 may transmit a signal corresponding to a predetermined key operation of the user input unit 430 or a signal corresponding to the movement of the remote control device 200 sensed by the sensor unit 440 through the wireless communication unit 420.

The user input interface unit 150 of the display device 100 may include a wireless communication unit 411 capable of wirelessly transmitting and receiving signals to and from the remote control device 200, and a coordinate value calculating unit 415 capable of calculating coordinate values of a pointer corresponding to the operation of the remote control device 200.

The user input interface unit 150 may transmit and receive signals wirelessly to and from the remote control device 200 through the RF module 412. In addition, signals transmitted by the remote control device 200 according to the IR communication standard may be received through the IR module 413.

The coordinate value calculating unit 415 may correct a hand shake or an error based on a signal corresponding to the operation of the remote control device 200 received through the wireless communication unit 411, and calculate the coordinate values (x, y) of the pointer 205 to be displayed on the display unit 180.

The transmission signal of the remote control device 200 input to the display device 100 through the user input interface unit 150 may be transmitted to the control unit 170 of the display device 100. The control unit 170 may determine information on the operation and key operation of the remote control device 200 based on the signal transmitted by the remote control device 200, and control the display device 100 in response thereto.

As another example, the remote control device 200 may calculate pointer coordinate values corresponding to the operation and output the same to the user input interface unit 150 of the display device 100. In this case, the user input interface unit 150 of the display device 100 may transmit information on the received pointer coordinate values to the control unit 170 without a separate process of correcting a hand shake or error.

In addition, as another example, the coordinate value calculating unit 415 may be provided in the control unit 170 instead of the user input interface unit 150 unlike the drawing.

Figure 5:
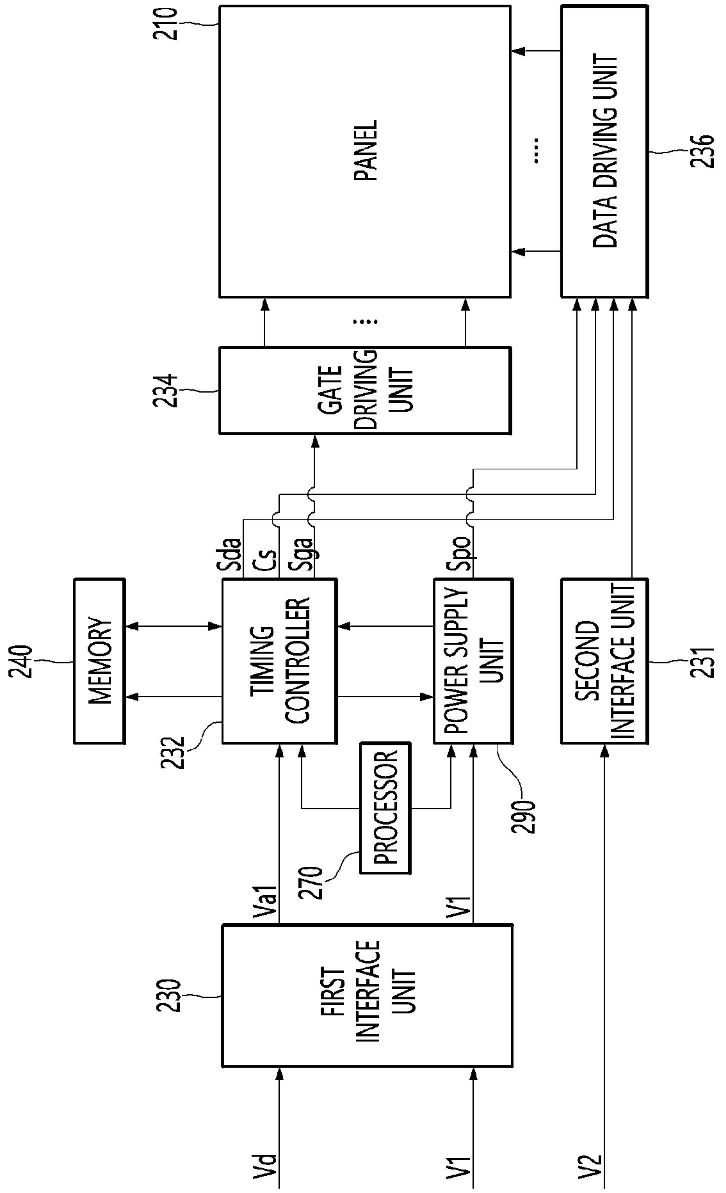
FIG. 5 is an internal block diagram of a display unit of FIG. 2.

FIG. 5 is an internal block diagram of a display unit of FIG. 2.

Referring to the drawing, the display unit 180 based on an organic light emitting panel may include a panel 210, a first interface unit 230, a second interface unit 231, a timing controller 232, a gate driving unit 234, a data driving unit 236, a memory 240, a processor 270, a power supply unit 290, and the like.

The display unit 180 may receive a video signal Vd, first DC power V1, and second DC power V2, and display a predetermined video based on the video signal Vd.

Meanwhile, the first interface unit 230 in the display unit 180 may receive the video signal Vd and the first DC power V1 from the control unit 170.

Here, the first DC power supply V1 may be used for the operation of the power supply unit 290 and the timing controller 232 in the display unit 180.

Next, the second interface unit 231 may receive the second DC power V2 from the external power supply unit 190. Meanwhile, the second DC power V2 may be input to the data driving unit 236 in the display unit 180.

The timing controller 232 may output a data driving signal Sda and a gate driving signal Sga based on the video signal Vd.

For example, when the first interface unit 230 converts the input video signal Vd and outputs the converted video signal val, the timing controller 232 may output the data driving signal Sda and the gate driving signal Sga based on the converted video signal val.

The timing controller 232 may further receive a control signal, a vertical synchronization signal Vsync, and the like, in addition to the video signal Vd from the control unit 170.

In addition, the timing controller 232 may output the gate driving signal Sga for the operation of the gate driving unit 234 and the data driving signal Sda for operation of the data driving unit 236 based on a control signal, the vertical synchronization signal Vsync, and the like, in addition to the video signal Vd.

In this case, the data driving signal Sda may be a data driving signal for driving of RGBW subpixels when the panel 210 includes the RGBW subpixels.

Meanwhile, the timing controller 232 may further output the control signal Cs to the gate driving unit 234.

The gate driving unit 234 and the data driving unit 236 may supply a scan signal and the video signal to the panel 210 through a gate line GL and a data line DL, respectively, according to the gate driving signal Sga and the data driving signal Sda from the timing controller 232. Accordingly, the panel 210 may display a predetermined video.

Meanwhile, the panel 210 may include an organic light emitting layer and may be arranged such that a plurality of gate lines GL intersect a plurality of data lines DL in a matrix form in each pixel corresponding to the organic light emitting layer to display a video.

Meanwhile, the data driving unit 236 may output a data signal to the panel 210 based on the second DC power supply V2 from the second interface unit 231.

The power supply unit 290 may supply various levels of power to the gate driving unit 234, the data driving unit 236, the timing controller 232, and the like.

The processor 270 may perform various control of the display unit 180. For example, the gate driving unit 234, the data driving unit 236, the timing controller 232 or the like may be controlled.

Figure 6A:
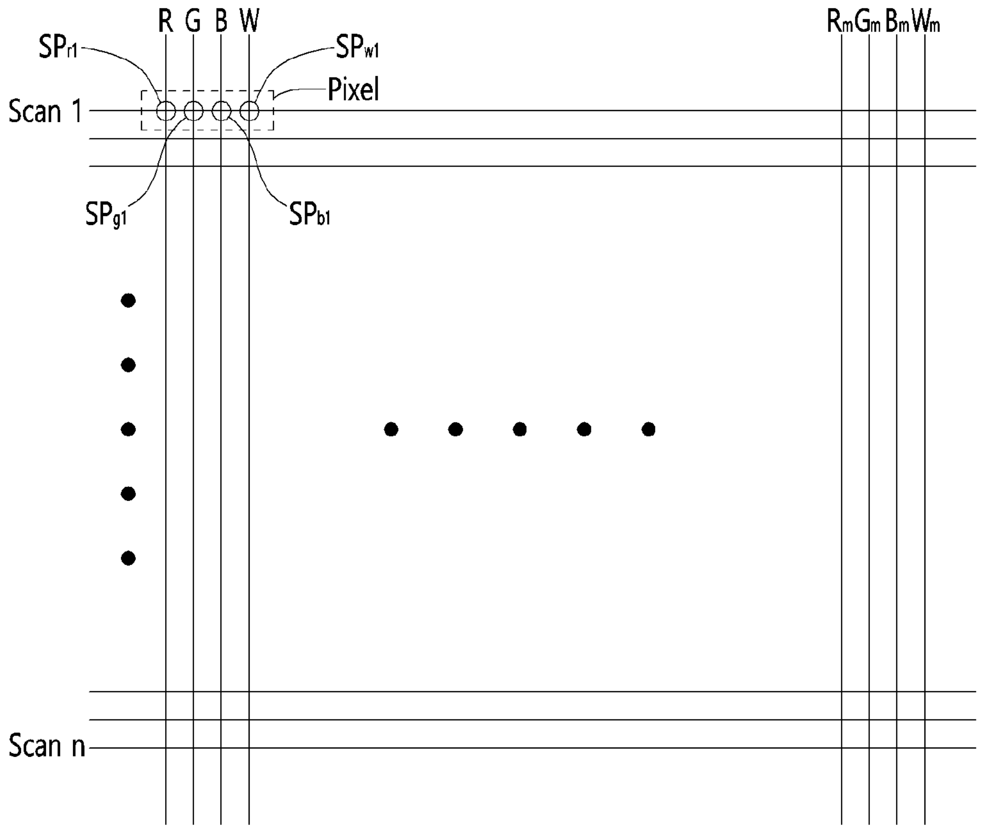
FIGS. 6A to 6B are views referred to for description of an organic light emitting panel of FIG. 5.
Figure 6B:
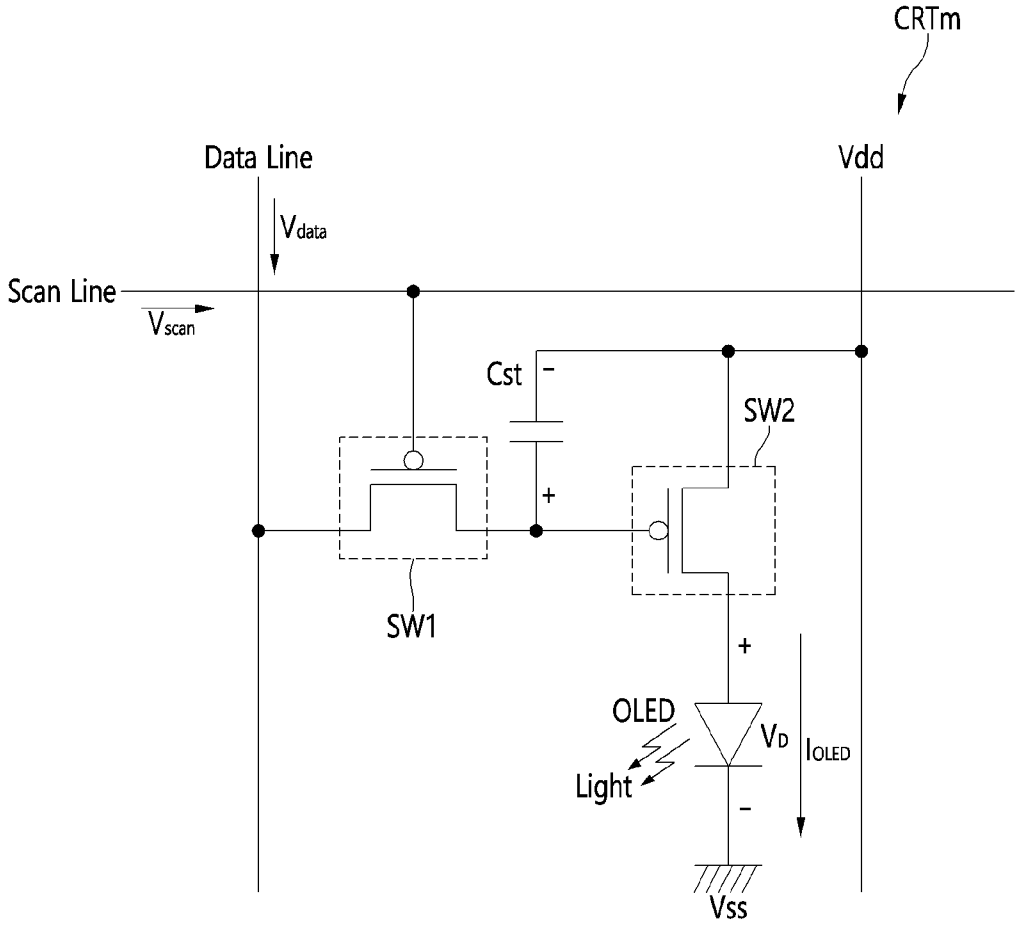

FIGS. 6A to 6B are views referred to for description of an organic light emitting panel of FIG. 5.

First, FIG. 6A is a diagram showing a pixel in the panel 210. The panel 210 may be an organic light emitting panel.

Referring to the drawing, the panel 210 may include a plurality of scan lines (Scan 1 to Scan n) and a plurality of data lines (R1, G1, B1, W1 to Rm, Gm, Bm and Wm) intersecting the scan lines.

Meanwhile, a pixel is defined at an intersection region of the scan lines and the data lines in the panel 210. In the drawing, a pixel having RGBW sub-pixels SPr1, SPg1, SPb1, and SPw1 is shown.

In FIG. 6A, although it is illustrated that the RGBW sub-pixels are provided in one pixel, RGB subpixels may be provided in one pixel. That is, it is not limited to the element arrangement method of a pixel.

FIG. 6B illustrates a circuit of a sub pixel in a pixel of the organic light emitting panel of FIG. 6A.

Referring to the drawing, an organic light emitting sub-pixel circuit CRTm may include a scan switching element SW1, a storage capacitor Cst, a driving switching element SW2, and an organic light emitting layer OLED, as active elements.

The scan switching element SW1 may be connected to a scan line at a gate terminal and may be turned on according to a scan signal Vscan, which is input. When the scan switching element SW1 is turned on, the input data signal Vdata may be transferred to the gate terminal of the driving switching element SW2 or one terminal of the storage capacitor Cst.

The storage capacitor Cst may be formed between the gate terminal and the source terminal of the driving switching element SW2, and store a predetermined difference between the level of a data signal transmitted to one terminal of the storage capacitor Cst and the level of the DC power Vdd transferred to the other terminal of the storage capacitor Cst.

For example, when the data signals have different levels according to a Pulse Amplitude Modulation (PAM) method, the level of power stored in the storage capacitor Cst may vary according to a difference in the level of the data signal Vdata.

As another example, when the data signals have different pulse widths according to the Pulse Width Modulation (PWM) method, the level of the power stored in the storage capacitor Cst may vary according to a difference in the pulse width of the data signal Vdata.

The driving switching element SW2 may be turned on according to the level of the power stored in the storage capacitor Cst. When the driving switching element SW2 is turned on, a driving current IOLED, which is proportional to the level of the stored power, flows through the organic light emitting layer OLED. Accordingly, the organic light emitting layer OLED may perform a light emitting operation.

The organic light emitting layer (OLED) includes a light emitting layer (EML) of RGBW corresponding to a sub-pixel, and may include at least one of a hole injection layer (HIL), a hole transport layer (HTL), an electron transport layer (ETL), and an electron injection layer (EIL) and may further include a hole blocking layer.

On the other hand, the sub pixels may emit white light in the organic light emitting layer (OLED) but, in the case of green, red, blue sub-pixels, a separate color filter is provided for realization of color. That is, in the case of green, red, and blue subpixels, green, red, and blue color filters are further provided, respectively. Meanwhile, since a white sub-pixel emits white light, a separate color filter is unnecessary.

On the other hand, although p-type MOSFETs are illustrated as the scan switching element SW1 and the driving switching element SW2 in the drawing, n-type MOSFETs or other switching elements such as JFETs, IGBTs, or SICs may be used.

Figure 7:
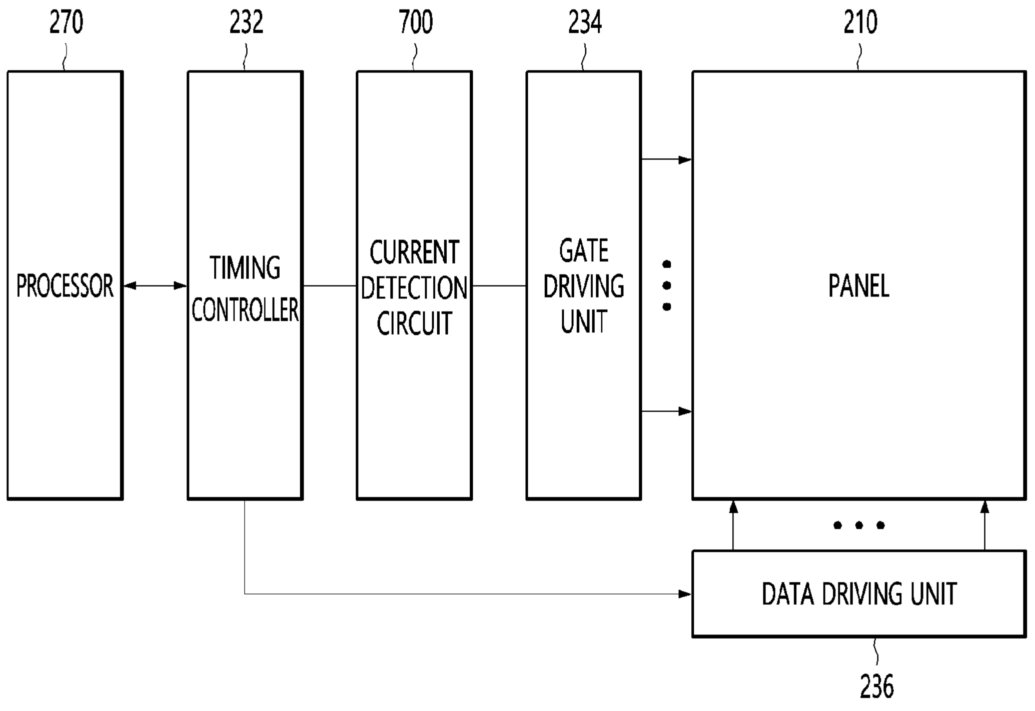
FIGS. 7 and 8 are block diagram for explaining a configuration of a display unit according to further another embodiment of the present disclosure.
Figure 8:
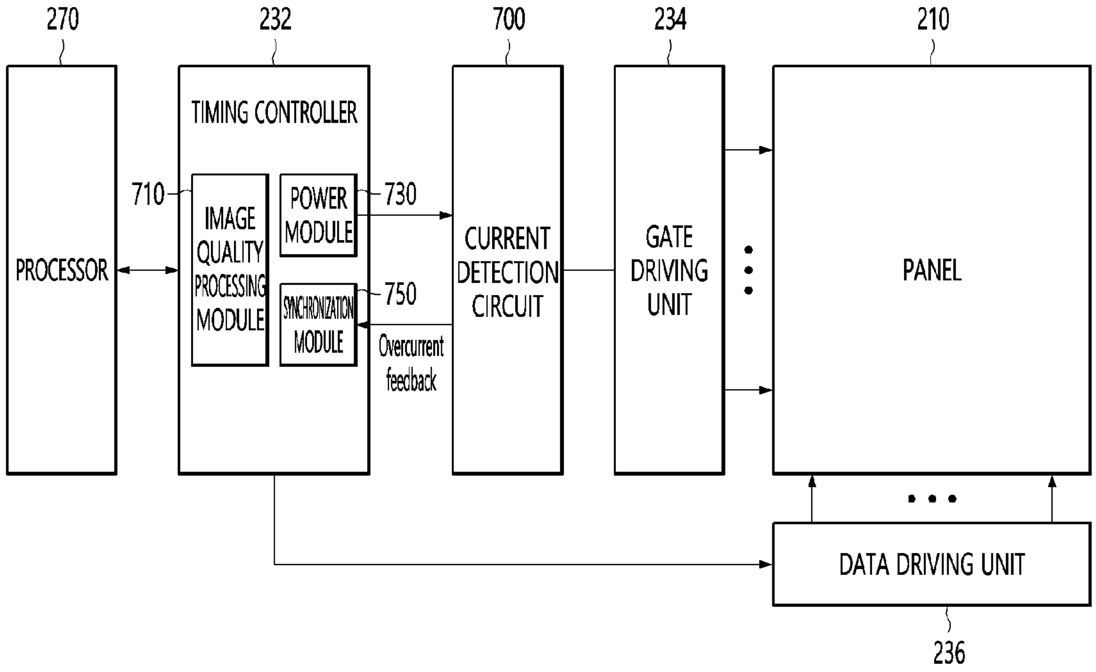

FIGS. 7 and 8 are block diagram for explaining a configuration of a display unit according to further another embodiment of the present disclosure.

Referring to FIG. 7, a display unit 180 may include a processor 270, a timing controller 232, a current detection circuit 700, a gate driving unit 234, a data driving unit 236, and a panel 210.

The display unit 180 of FIG. 7 may further include the current detection circuit 700 compared to a configuration of FIG. 5.

The current detection circuit 700 may detect current flowing through the gate driving unit 234.

Specifically, the current detection circuit 700 may detect current of a gate high signal or gate low signal transmitted from the timing controller 232 to the gate driving unit 234.

When a magnitude of the detected current is greater than or equal to a preset magnitude, the current detection circuit 700 may transmit feedback indicating overcurrent to the timing controller 232.

The timing controller 232 may transmit a system off signal to the processor 270 to turn off the display unit 180 according to the feedback indicating the overcurrent.

The processor 270 may turn off power supplied to the display unit 180 according to the system off signal received from the timing controller 232. Thus, the power of the display unit 180 may be turned off.

The processor 270 may be provided on a main board.

Referring to FIG. 8, a configuration of the timing controller 232 will be described in more detail.

The timing controller 232 may include an image quality processing module 710, a power module 730, and a synchronization module 750.

The image quality processing module 710 may adjust a value of an image quality factor of the video to be displayed on the panel 210.

The power module 730 may supply the power to the gate driving unit 234 or the data driving unit 236.

In particular, the power module 730 may transmit the gate high signal or the gate low signal to the gate driving unit chip included in the gate driving unit 234.

The synchronization module 750 may be a module that synchronizes sequences of the gate high signal and the gate low signal.

The current detection circuit 700 may measure the current transmitted to the gate driving unit 234.

When the measured current is overcurrent, the current detection circuit 700 may transmit the feedback indicating the overcurrent to the synchronization module 750.

The synchronization module 750 may transmit a control signal to the processor 270 to turn on a burnt detection protection (BDP) function according to the feedback indicating the overcurrent.

The BDP function may be a function that turns off the power to the display unit 180 to prevent elements constituting the display unit 180 from being burnt due to an abnormal operation of the display unit 180.

When the BDP function is turned on, the processor 270 may cut off the power supplied to the display unit 180.

When the BDP function is turned off, the processor 270 may maintain the power supply to the display unit 180.

Figure 9:
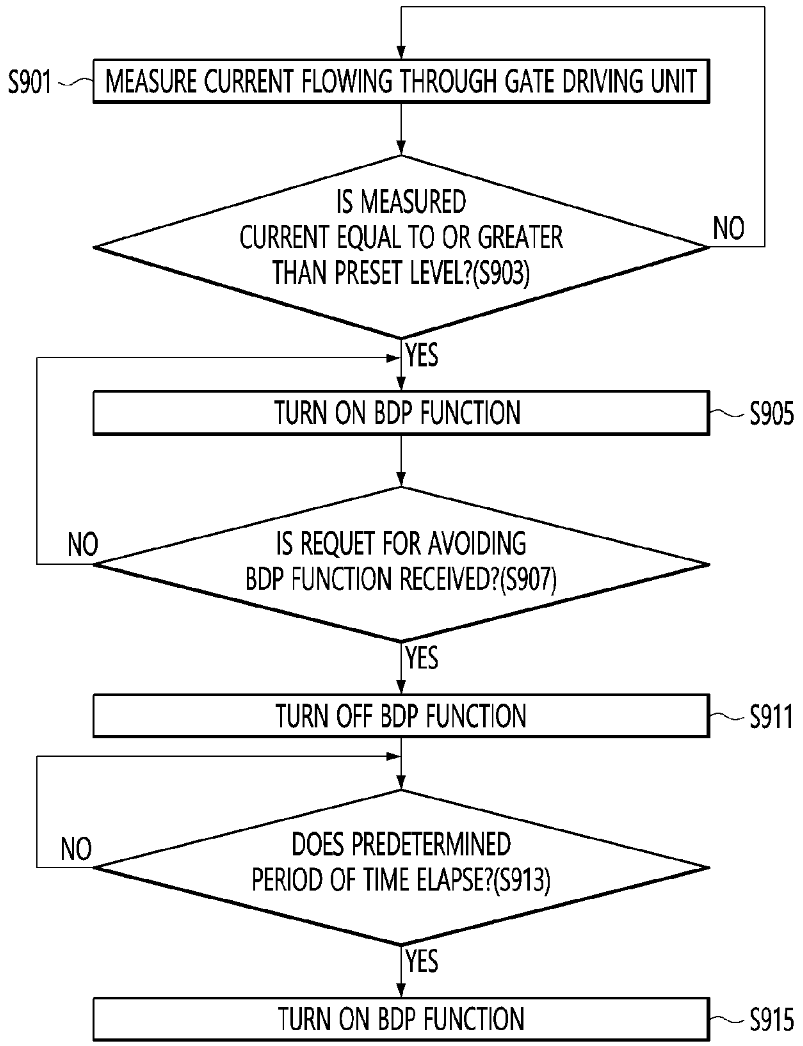
FIG. 9 is a flowchart for explaining a method for operating an organic light emitting diode display according to an embodiment of the present disclosure.

FIG. 9 is a flowchart for explaining a method for operating an organic light emitting diode display according to an embodiment of the present disclosure.

Hereinafter, the embodiment of FIG. 9 will be described with reference to the embodiment of FIGS. 7 and 8.

Hereinafter, a current detection circuit 700 measures current flowing through a gate driving unit 234 (S901).

Specifically, the current detection circuit 700 may measure current of a gate high signal or gate low signal transmitted from a power module 730 to the gate driving unit 234.

The current detection circuit 700 may also be included in a timing controller 232.

The current detection circuit 700 determines whether the measured current is greater than or equal to a preset level, and when the measured current is greater than or equal to the preset level, feedback indicating overcurrent is transmitted to the timing controller 232 (S903).

The current detection circuit 700 may fed back the measured current to the timing controller 232 in real time.

When the current provided to the gate driving unit 234 is the overcurrent, the module constituting the display unit 180 may be damaged, and the video displayed through the panel 210 may be broken.

This will be explained with reference to FIGS. 10 and 11.

Figure 10:
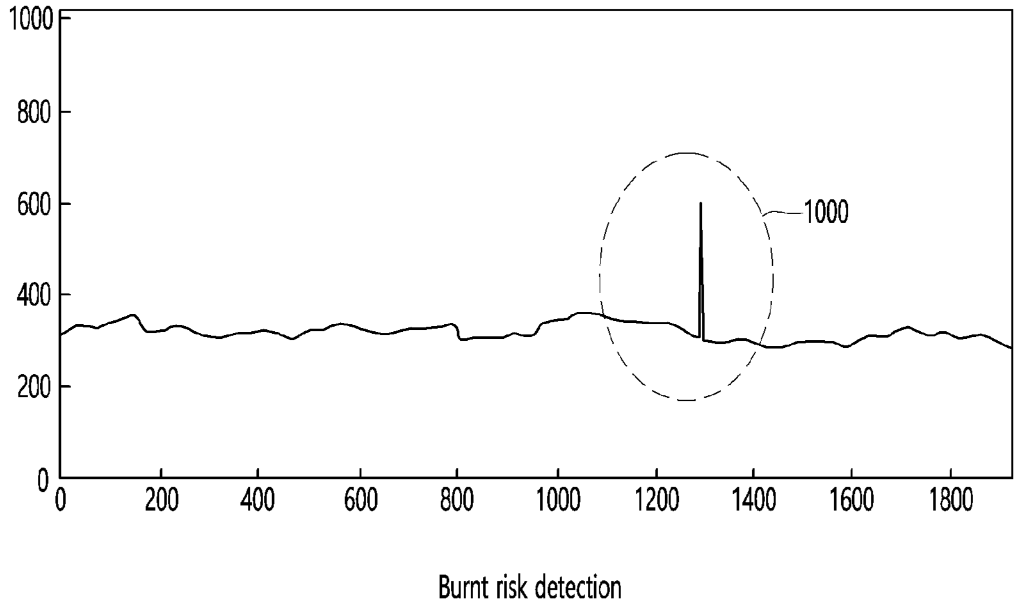
FIGS. 10 and 11 are views for explaining an occurrence of a burnt phenomenon when a video is watched through a display unit.
Figure 11:
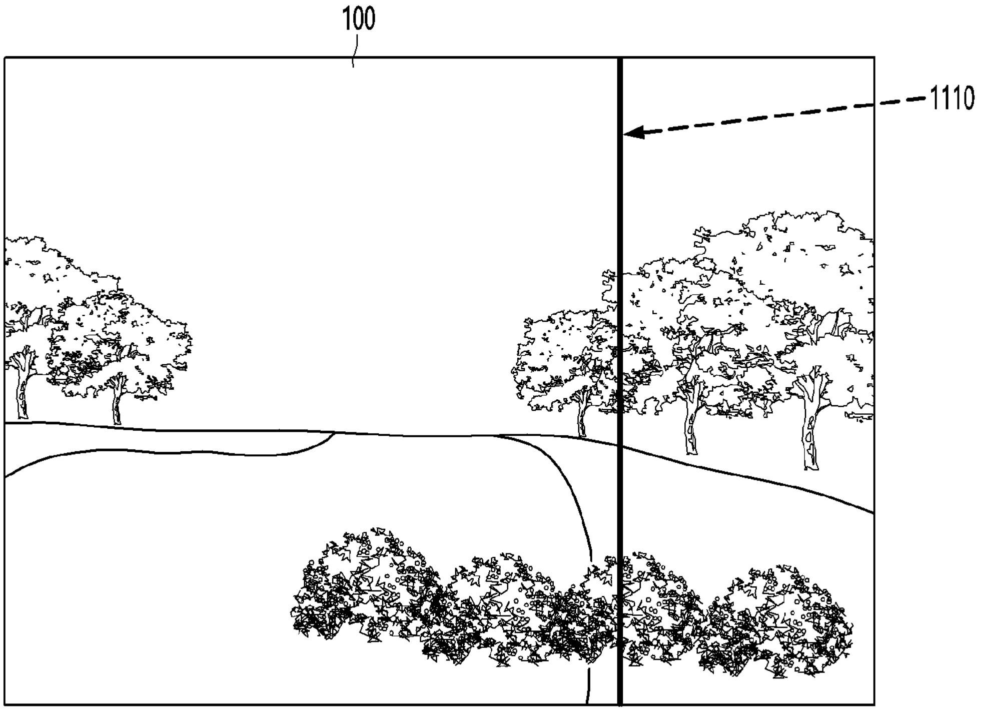

FIGS. 10 and 11 are views for explaining an occurrence of a burnt phenomenon when a video is watched through a display unit.

Referring to FIG. 10, while watching a video, the current detection circuit 700 may detect the current flowing through the gate driving unit 234.

When the measured current is greater than a preset magnitude, as illustrated in FIG. 10, a burnt phenomenon 1000 in which the current has an abnormal magnitude may occur at the time of measurement.

When the burnt phenomenon 1000 occurs, a problem in which a portion of an image 1100 is broken may occur as illustrated in FIG. 11.

That is, if the current flowing through a specific gate line is overcurrent, a burnt image 1110 may be generated.

The burnt image 1110 interferes with viewing of the image 1100 to cause a problem in elements constituting the display device 100, and thus, countermeasures need to be implemented.

FIG. 9 will be described again.

The timing controller 232 turns on the BDP function upon the receipt of the feedback indicating the overcurrent (S905).

The timing controller 232 may transmit a control signal to turn on the BDP function to the processor 270. The processor 270 may turn off the display unit 180 according to the received control signal.

In further another embodiment, the timing controller 232 may turn off the display unit 180 on its own upon the receipt of the feedback indicating the overcurrent.

Thereafter, the timing controller 232 determines whether a request for avoiding the BDP function has been received (S907).

In an embodiment, the request to avoid the BDP function may be a request to temporarily turn off the BDP function.

The request to avoid the BDP function may be a request to temporarily turn off the BDP function after the BDP function is turned on according to the detection of the overcurrent.

The request to avoid the BDP function may be used to solve the problem that when the BDP function is turned on, the display unit 180 is turned off, and the cause of the burnt phenomenon is not properly identified.

In an embodiment, the request to avoid the BDP function may be a request to select a local key provided in an user input interface unit 150. More specifically, the request to avoid the BDP function may be an input of pressing the local key for 5 seconds. Here, 5 seconds is just an example.

In further another embodiment, the request for avoidance of the BDP function may be a control command received from a remote control device 200. The control command may be generated by selecting a button provided on the remote control device 200.

In further another embodiment, the request to avoid the BDP function may be a voice command received through a microphone (not shown). The voice command may include an utterance to turn off the BDP function.

When the timing controller 232 receives the request to avoid the BDP function, the BDP function is turned off (S911).

As the timing controller 232 receives the request to avoid the BDP function, the timing controller 232 may transmit the control signal to the processor 270 to turn off the BDP function.

The processor 270 may turn on a system according to the control signal received from the timing controller 232. That is, the processor 270 may control a power supply unit 190 to turn off the BDP function and apply power to the display unit 180.

As the BDP function is turned off, the power is applied to the display unit 180 and then be turned on.

When the BDP function is turned off, the timing controller 232 determines whether a predetermined period of time elapses (S913).

In an embodiment, the predetermined period of time may be a time for a manager to check and review symptoms of the modules constituting the display device 100. The predetermined period of time may be 5 minutes, but this is only an example and may vary depending on the manager's settings.

The manager may check whether a defect occurs in a gate driving unit 234 based on a power on/off history displayed on the display unit 180 for a predetermined period of time.

If there is a record of the BDP function being turned on through the power on/off history, the manager may confirm that the defect has occurred in the gate driving unit 234.

This will be described in detail later.

When the predetermined period of time elapses, the timing controller 232 turns on the BDP function again (S915).

After the predetermined period of time elapses, the timing controller 232 may determine that the review time for checking the module symptoms elapses to turn on the BDP function. Thus, the display unit 180 may be turned off.

Figure 12:
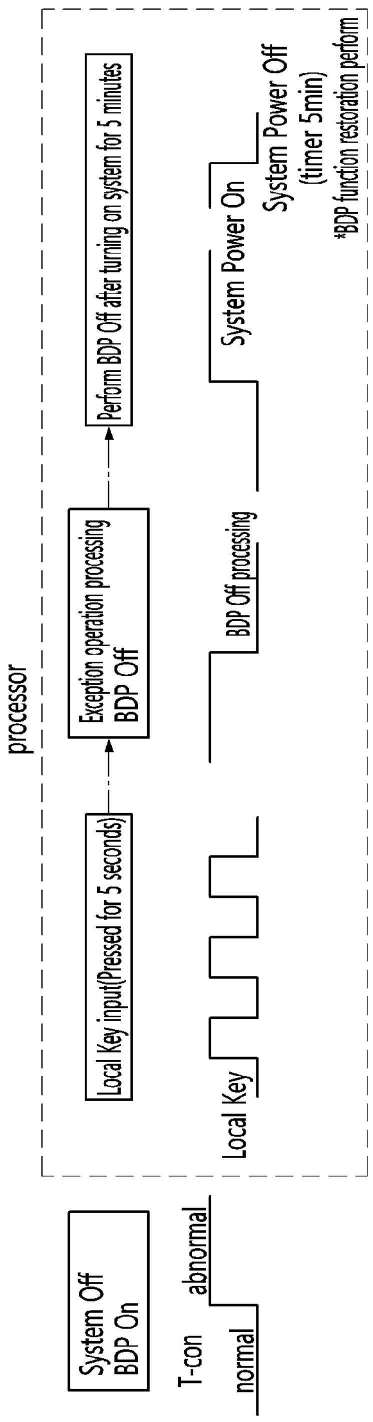
FIG. 12 is a view illustrating a method for reviewing a defective module through avoiding a BDP function according to an embodiment of the present disclosure.

FIG. 12 is a view illustrating a method for reviewing a defective module through avoiding the BDP function according to an embodiment of the present disclosure.

In FIG. 12, system off may mean the turn-off of the power of the display device 100 or the display unit 180.

When the timing controller 232 receives feedback indicating overcurrent from the current detection circuit 700, an abnormal signal may be transmitted to the processor 270 to turn on the BDP function.

The processor 270 may determine whether the local key input for avoiding the BDP function is received. When the processor 270 receives the local key input provided on the display device 100 for 5 seconds, it may determine that the request for avoiding the BDP function has been received.

That is, the processor 270 determines that an input for exception processing of the BDP function has been received to turn off the BDP function.

The processor 270 may turn off the BDP function for a predetermined period of time. The predetermined period of time may be 5 minutes.

The manager may check whether a defect occurs in the gate driving unit 234 of the display unit 180 for 5 minutes.

When the display device 100 is turned off due to an abnormal operation of the display device 100, the manager may not determine which component caused the abnormal operation.

When the BDP function is turned on, the manager may check that a defect has occurred in the gate driving unit 234. The manager may check whether the defect has occurred in the gate driving unit 234 through the power on/off history.

If the system is turned off, but there is no history of the BDP function being turned on, the manager may determine that the defect has occurred in a main board or power board, which are components other than the gate driving unit 234.

The processor 270 may be provided with a timer to determine whether 5 minutes have elapsed through the timer.

The processor 270 may turn on the BDP function again when 5 minutes elapse. That is, as a result, the power applied to the display unit 180 may be cut off.

As described above, according to an embodiment of the present disclosure, a clear determination on the cause of the module defect problem that is estimated when the display unit 180 is turned off may be realized.

In addition, debug may be detected using only a simple circuit that is called the current detection circuit 700, to improve development efficiency.

Figure 13:
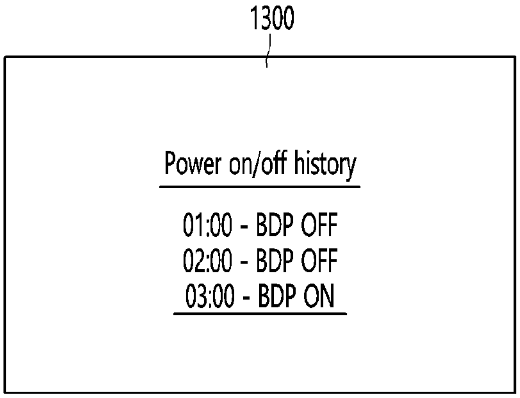
FIG. 13 is a view illustrating on/off history according to an embodiment of the present disclosure.

FIG. 13 is a view illustrating on/off history according to an embodiment of the present disclosure.

Referring to FIG. 13, after receiving the request to avoid the BDP function, the display device 100 may display the power on/off history 1300 through the panel 210 according to the input for entering a factory mode.

The power on/off history 1300 may include an on/off history of the power of the display unit 180 and an on/off history of the BDP function.

The administrator may check the on/off history of the BDP function through the power on/off history 1300. When the BDP function is turned on, the manager may check that an error has occurred in the gate driving unit 234. The manager may check that overcurrent has occurred in the gate driving unit 234 when the BDP function is turned on.

As described above, it may be easily checked whether a defect has occurred in the gate driving unit 234 through the power on/off history 1300.

Figure 14:
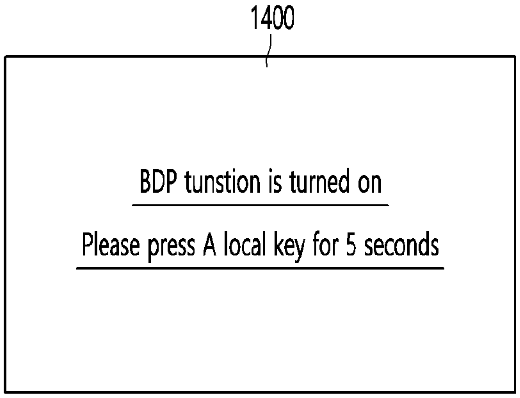
FIGS. 14 and 15 are view for explaining a guide displayed after the BDP function is turned and before the display unit is turned off according to an embodiment of the present disclosure.
Figure 15:
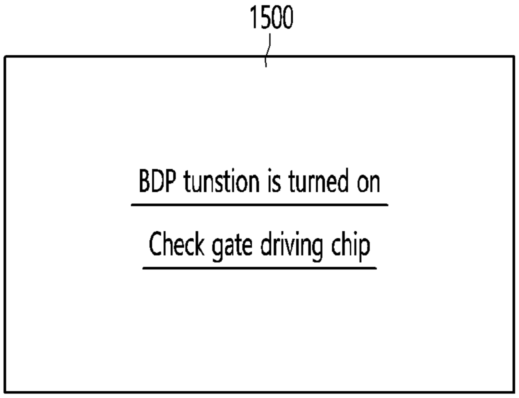

FIGS. 14 and 15 are view for explaining a guide displayed after the BDP function is turned and before the display unit is turned off according to an embodiment of the present disclosure.

Referring to FIG. 14, the panel 210 may turn on the BDP function to display a first guide 1400 that guides a local key input for avoiding the BDP function.

The first guide 1400 may include text instructing to select an A local key provided in the display device 100 for 5 seconds.

Referring to FIG. 15, the panel 210 may turn on the BDP function to display a second guide 1500 indicating the reason why the BDP function is turned on.

That is, the second guide 1500 may include text requesting inspection of the gate driving chip (gate driving unit).

The manager may easily check the cause of the defect in the display unit 180 through the first and second guides 1400 and 1500.

According to an embodiment of the present disclosure, the above-described method may also be embodied as processor readable codes on a processor readable recording medium. Examples of the processor readable medium include read-only memory (ROM), random-access memory (RAM), CD-ROMs, magnetic tapes, floppy disks, and optical data storage devices.

In the above-described display device, the embodiments set forth therein are not so limitedly, but all or part of the embodiments can be selectively combined so as to derive many variations.

The invention claimed is:

1. An organic light emitting diode display comprising:

a display panel comprising a plurality of pixels;

a gate driving unit configured to drive a plurality of gate lines respectively connected to the plurality of pixels;

a data driving unit configured to drive a plurality of data lines respectively connected to the plurality of pixels;

a current detection circuit configured to detect current flowing through each of the gate lines and generate feedback that indicates overcurrent of the detected current; and a timing controller configured to turn off power of the organic light emitting diode display in response to the feedback indicating overcurrent, wherein the timing controller is configured to:

turn on a burnt detection protection (BDP) function based on the feedback, turn on the power of the organic light emitting diode display in response to receiving a request to avoid the BDP function for a predetermined length of time to allow for a determination of a cause of the overcurrent while the power is turned on, wherein the request to avoid the BDP function is received based on a user input, and resume the BDP function after the predetermined length of time has elapsed after the power is turned on in response to the request to avoid the BDP function.

2. The organic light emitting diode display according to claim 1, further comprising a user input interface unit comprising a plurality of local keys, wherein the request to avoid the BDP function is based on an input to one of the plurality of local keys.

3. The organic light emitting diode display according to claim 1, further comprising a user input interface unit configured to receive commands from a remote control device, wherein the request to avoid the BDP function is received via a command received from the remote control device via the user input interface unit.

4. The organic light emitting diode display according to claim 1, wherein the display panel displays a first guide to select a specific local key when the BDP function is turned on.

5. The organic light emitting diode display according to claim 1, wherein, when the BDP function is turned on, the display panel displays a second guide that requests inspection of the gate driving unit.

6. A method for operating an organic light emitting diode display comprising a display panel comprising a plurality of pixels, a gate driving unit configured to drive a plurality of gate lines respectively connected to the plurality of pixels, and a data driving unit configured to drive a plurality of data lines respectively connected to the plurality of pixels, the method comprising:

detecting current flowing through each of the gate lines;

generating feedback that indicates overcurrent of the detected current;

turning off power of the organic light emitting diode display in response to the feedback indicating overcurrent;

turning on a burnt detection protection (BDP) function based on the feedback;

turning on the power of the organic light emitting diode display in response to receiving a request for avoiding the BDP function for a predetermined length of time to allow for a determination of a cause of the overcurrent while the power is turned on, wherein the request to avoid the BDP function is received based on a user input; and resuming the BDP function after the predetermined length of time has elapsed after the power is turned on in response to the request to avoid the BDP function.

7. The method according to claim 6, wherein the organic light emitting diode display further comprises a user input interface unit comprising a plurality of local keys, and the request to avoid the BDP function is based on an input to one of the plurality of local keys.

8. The method according to claim 7, wherein the organic light emitting diode display further comprises a user input interface unit configured to receive commands from a remote control device, and wherein the request to avoid the BDP function is received via a command received from the remote control device via the user input interface unit.

9. The method according to claim 6, further comprising displaying a first guide to select a specific local key when the BDP function is turned on.

* * * * *